US010454525B2

United States Patent
Bobrek (10) Patent No.: US 10,454,525 B2
(45) Date of Patent: Oct. 22, 2019

(54) COMMUNICATION OF SIGNALS OVER FUEL LINES IN A VEHICLE

(71) Applicant: GE Aviation Systems LLC, Grand Rapids, MI (US)

(72) Inventor: Pavlo Bobrek, Bradenton, FL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 177 days.

(21) Appl. No.: 15/186,766

(22) Filed: Jun. 20, 2016

(65) Prior Publication Data

US 2017/0366225 A1    Dec. 21, 2017

(51) Int. Cl.
| | |
|---|---|
| *H01Q 1/32* | (2006.01) |
| *H01Q 1/34* | (2006.01) |
| *H04B 5/00* | (2006.01) |
| *B60K 15/00* | (2006.01) |
| *B60K 15/01* | (2006.01) |

(Continued)

(52) U.S. Cl.
CPC .............. *H04B 3/02* (2013.01); *B60K 15/00* (2013.01); *B64D 37/00* (2013.01); *G08C 23/00* (2013.01); *H01Q 1/28* (2013.01); *H01Q 1/44* (2013.01); *H04B 5/0081* (2013.01); *H04L 67/12* (2013.01); *B60K 15/01* (2013.01); *H01Q 1/32* (2013.01); *H01Q 1/34* (2013.01); *Y02T 50/44* (2013.01)

(58) Field of Classification Search
CPC ........ H04B 3/50; H04B 3/46; H04B 10/0773; H04B 10/1143; H04B 3/03; H04B 3/00; H04B 3/52; H04B 5/0031; H04B 5/0081; H04B 3/30; H04B 10/40; H04B 10/0775; H04B 1/02; H04B 1/06; H04B 1/40; H04B 3/548; H04B 3/58
USPC .......................................... 307/104; 775/219
See application file for complete search history.

(56) References Cited

U.S. PATENT DOCUMENTS

| | | | | |
|---|---|---|---|---|
| 4,187,720 | A | * | 2/1980 | Baker ................. F02M 65/003 73/114.48 |
| 5,973,903 | A | * | 10/1999 | Tomerlin ............... B64D 37/32 361/212 |

(Continued)

FOREIGN PATENT DOCUMENTS

| | | |
|---|---|---|
| CN | 102322507 A | 1/2012 |
| DE | 40 37 600 A1 | 6/1992 |

(Continued)

OTHER PUBLICATIONS

Extended European Search Report and Opinion issued in connection with corresponding EP Application No. 17176604.1 dated Oct. 24, 2017.

(Continued)

*Primary Examiner* — David C Payne
*Assistant Examiner* — Sarah Hassan
(74) *Attorney, Agent, or Firm* — Dority & Manning, P.A.

(57) ABSTRACT

Systems and methods for communicating a signal over a fuel line in a vehicle are provided. In one embodiment, a system can include a fuel line. The fuel line can include at least one communication medium for propagating a communication signal. The system can also include at least one signal communication device configured to receive the communication signal communicated over the fuel line. The system can also include at least one vehicle component in communication with the at least one signal communication device.

13 Claims, 5 Drawing Sheets

(51) Int. Cl.
*H04B 3/02* (2006.01)
*H04L 29/08* (2006.01)
*B64D 37/00* (2006.01)
*G08C 23/00* (2006.01)
*H01Q 1/28* (2006.01)
*H01Q 1/44* (2006.01)

(56) References Cited

U.S. PATENT DOCUMENTS

| | | | |
|---|---|---|---|
| 6,195,247 B1 | 2/2001 | Cote et al. | |
| 6,470,258 B1 | 10/2002 | Leamy et al. | |
| 7,236,503 B2 | 6/2007 | Sexton et al. | |
| 8,825,227 B2* | 9/2014 | Saint-Marc | B64D 31/00 |
| | | | 701/16 |
| 9,026,273 B2 | 5/2015 | Ziarno | |
| 9,121,769 B2 | 9/2015 | Scheid et al. | |
| 9,217,376 B2 | 12/2015 | Sweet et al. | |
| 9,239,578 B2 | 1/2016 | Ziarno | |
| 2006/0132382 A1* | 6/2006 | Jannard | G02C 11/06 |
| | | | 345/8 |
| 2007/0032271 A1* | 2/2007 | Chan | H04M 1/035 |
| | | | 455/569.1 |
| 2011/0012661 A1* | 1/2011 | Binder | A63F 9/24 |
| | | | 327/276 |
| 2012/0068003 A1* | 3/2012 | Bajekal | B64C 27/008 |
| | | | 244/17.11 |
| 2014/0324238 A1* | 10/2014 | McBrien | G05B 15/02 |
| | | | 700/290 |
| 2016/0221816 A1* | 8/2016 | Pollock | B67D 7/348 |
| 2017/0366228 A1 | 12/2017 | Bobrek | |

FOREIGN PATENT DOCUMENTS

| | | |
|---|---|---|
| EP | 2 738 097 A1 | 6/2014 |
| EP | 2 961 087 A1 | 12/2015 |
| WO | 2007/076039 A2 | 7/2007 |
| WO | 2011/153496 A1 | 12/2011 |

OTHER PUBLICATIONS

Office Action issued in connection with corresponding CA Application No. 2968969 dated Nov. 8, 2017.

\* cited by examiner

COMMUNICATION OF SIGNALS OVER
FUEL LINES IN A VEHICLE

FIELD OF THE INVENTION

The present subject matter relates generally to communicating signals over fuel lines in a vehicle.

BACKGROUND OF THE INVENTION

Control of an engine on a vehicle, and in particular, a jet engine on an aircraft, has evolved to use automated digital controls (e.g., a Full Authority Digital Engine Control (FADEC) on an aircraft). For example, a controller (e.g., an Electronic Engine Controller (EEC) or Electronic Control Unit (ECU) of a FADEC) can control fuel flow, engine geometries, and other parameters to optimize performance of an engine during operation, such as during takeoff, flight and landing for an aircraft. Various parameters, such as the state of flight, state of aircraft systems and pilot commands an aircraft, can be communicated using digital signals from a system, such as an avionics system, to the controller.

The transmission of digital signals to a controller can add complexity to the design and maintenance of a vehicle when the controller is located on or in close proximity to an engine, such as on an aircraft. Further, transmission of digital signals between a communications network, such as an avionics network, and a controller of an engine on a vehicle can require dedicated wiring and interface connectors, which can add additional weight to the vehicle.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a system for communicating a signal over a fuel line on a vehicle. The system can include a fuel line. The fuel line can include at least one communication medium for propagating a communication signal. The system can also include at least one signal communication device configured to receive the communication signal communicated over the fuel line. The system can also include at least one vehicle component in communication with the at least one signal communication device.

Another example aspect of the present disclosure is directed to method of communicating a communication signal over a fuel line on a vehicle. The method can include receiving, by a communication medium of a fuel line on a vehicle, a communication signal. The method can also include communicating the communication signal over the communication medium. The method can also include receiving, by one or more signal communication devices, the communication signal communicated over the communication medium. The method can also include providing, by the signal communication device, the communication signal to one or more components of the aircraft.

Yet another example aspect of the present disclosure is directed to an aircraft. The aircraft can include at least one engine, a controller configured to control the at least one engine, an avionics network, and at least one fuel tank. The aircraft can also include at least one fuel line configured to transfer fuel from the at least one fuel tank to the at least one engine. The at least one fuel line can include a communication medium for propagating a communication signal. The aircraft can also include a first signal communication device in bidirectional communication with the avionics network. the first signal communication device can be coupled to the at least one fuel line. The aircraft can also include a second signal communication device in bidirectional communication with the controller. The second signal communication device can be coupled to the at least one fuel line. The first signal communication device and the second signal communication device can be in bidirectional signal communication with each other over the at least one fuel line.

Other example aspects of the present disclosure are directed to systems, methods, vehicles, avionics systems, devices, and non-transitory computer-readable media for communicating a signal over a fuel line in an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods of communicating signals over a fuel line in a vehicle, such as an aircraft, helicopter, automobile, boat, submarine, train, and/or any other suitable vehicle. For instance, a vehicle can include a fuel line, a signal communication device coupled to the fuel line, and a component of the vehicle (e.g., a communication network or controller) in communication with the signal communication device. The fuel line can include a medium for propagating a communication signal, such as an electrical conductor or a waveguide for sonic, microwave, millimeter wave, or optical signals. In an embodiment, the medium for propagating a signal can be fuel flowing through the fuel line. The signal communication device can be coupled to the fuel line such that the signal communication device can send or receive signals over the medium for propagating a signal of the fuel line. Further, the signal communication device can be in signal communication with the vehicle component, such as a communication network or a controller configured to control an engine on the vehicle, and can send signals received over the fuel line to the component. Additionally, the signal communication device can be configured to send signals received from the component over the fuel line, thereby allowing for bi-directional signal communication.

The communications medium of the fuel line can be any medium for propagating a signal. For example, the communications medium can be an electrical conductor electrically coupled to a common ground, such as, for example, a body portion of the vehicle itself. An electrically conducting fuel line and the common ground can together form a broadband antenna, which can receive a communication signal sent from a remote signal communication device. For example, a ground based antenna or satellite can send a communication signal in the form of electromagnetic waves, which can be received by the fuel line and common ground. The signal communication device can receive the communication signal received by the fuel line, and can provide the signal to a component of the vehicle, such as a communication network.

Further, the vehicle can include more than one signal communication device, and each signal communication device can be coupled to a component of the vehicle and a fuel line. For example, a first signal communication device can be coupled to a communication network and a fuel line. The communication network can include one or more computing devices, such as, for example, a computing device configured to receive an input from a user, such as a pilot. The user can input a command which can be communicated to the computing device. The computing device can then send a signal to the communication network, such as, for example, a signal to an avionics network corresponding to a setpoint for operation of an engine on an aircraft. The first signal communication device can be configured to receive the signal from the communication network, and further configured to send the signal over the fuel line to a second signal communication device. For example, the second signal communication device can also be coupled to the fuel line, and further can be in signal communication with a controller configured to control an engine on the vehicle, such as a jet engine on an aircraft. The second signal communication device can receive the signal sent by the first signal communication device over the fuel line, and can communicate the signal to the controller. For example, the setpoint for operation of an engine can be received by the second signal communication device, which can provide the setpoint to the controller.

A signal communication device can be configured for bi-directional signal communication over the fuel line. For example, a signal communication device can include a transceiver. The transceiver can be configured to send or receive signals to or from a vehicle component, such as controller or a communication network. The transceiver can be further configured to encode and/or decode a communication signal, such as, for example, encoding a digital signal received from a communication network into an analog signal. The signal communication device can also include a transducer coupled to the fuel line and in signal communication with the transceiver. For example, a transducer in a signal communication device can be configured to send or receive signals to or from the transceiver, such as, for example receiving an encoded analog signal from the transceiver. The transducer can further be configured to send the encoded analog signal over the communication medium of a fuel line. For example, in an embodiment, a fuel line can include an electrical conductor, and a transducer can include a conducting coil configured to communicate an encoded analog communication signal by creating a magnetic field that excites an electrical current in the electrical conductor corresponding to the encoded analog communication signal. The encoded analog communication signal can then travel over the fuel line as an electrical current. A second signal communication device can be coupled to the fuel line, and include a second transducer that includes a sensing coil configured to detect a magnetic field generated by the electrical current in the electrical conductor. The second transducer can thus be configured to receive the encoded analog communication signal in the form of variations in the magnetic field. The second transducer can further be configured to provide the encoded analog communication signal to a second transceiver, which can then decode the encoded analog communication signal into a digital signal. Further, the second transceiver can be configured to provide the decoded digital signal to a component of the vehicle, such as, for example, a controller configured to control an engine on an aircraft.

The systems and methods according to example aspects of the present disclosure can thus have a technical effect of allowing for communication of signals over fuel lines on a vehicle. For communication of signals between a communication network, such as an avionics network on an aircraft, and a controller in close proximity to an engine controlled by the controller, such as an engine on an aircraft, this can be particularly beneficial as it can allow for the elimination of a separate, dedicated communication medium in instances where the engine is provided fuel by a fuel line. In turn, this can reduce the number of components on the vehicle, potentially reducing the complexity of the systems on the vehicle, and further, can decrease weight of the vehicle, allowing for more fuel efficient travel.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Figure 1:
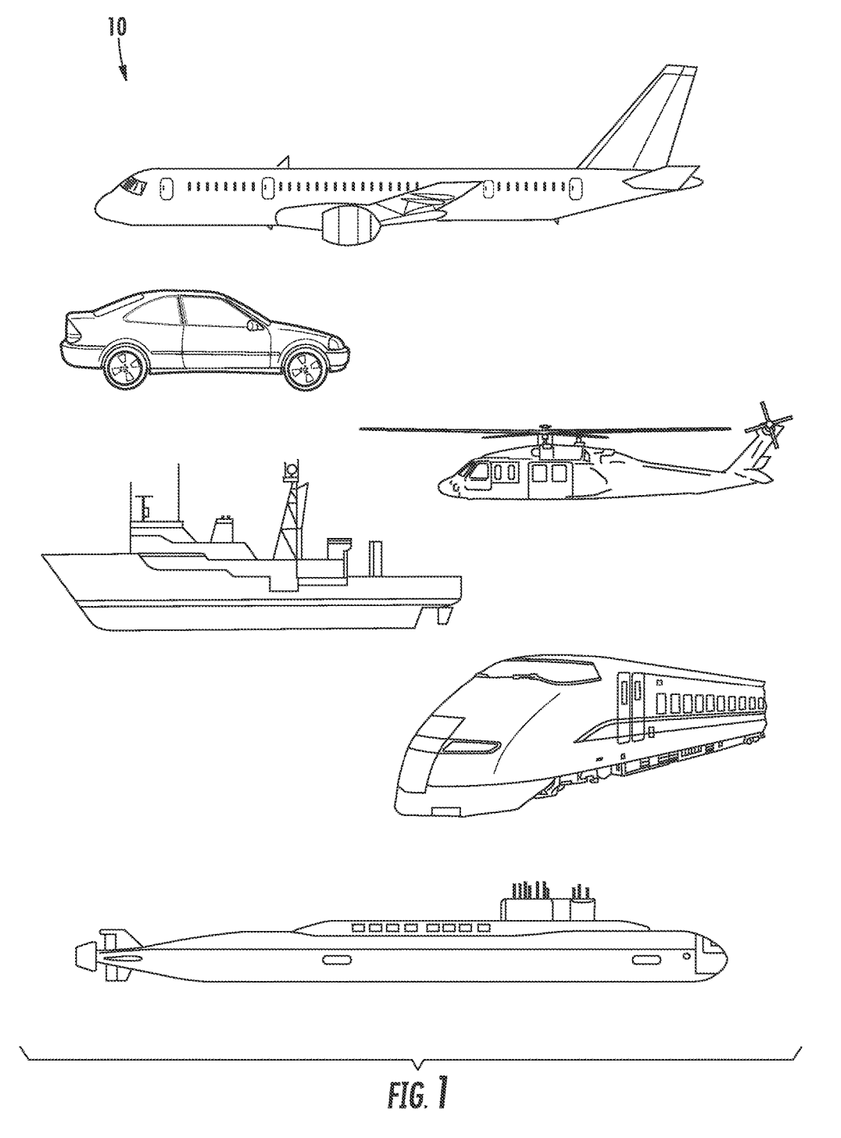
FIG. 1 depicts example vehicles according to example embodiments of the present disclosure.

Referring now to FIG. 1, example vehicles 10 according to example embodiments of the present disclosure are depicted. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

Figure 2:
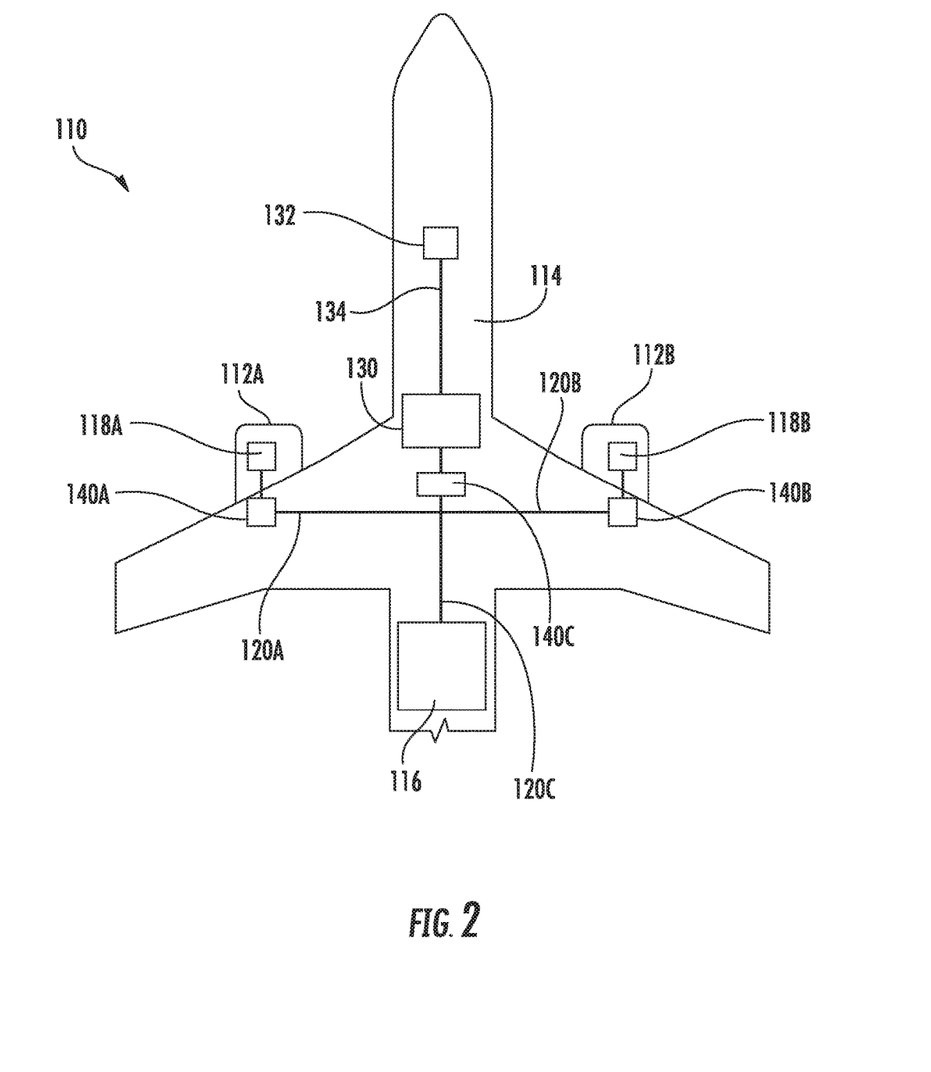
FIG. 2 depicts an example aircraft according to example embodiments of the present disclosure.

Referring now to FIG. 2, an example aircraft 110 according to example embodiments of the present disclosure is depicted. As shown, the aircraft 110 can include one or more engine(s) 112, a fuselage 114, one or more fuel tank(s) 116, one or more controller(s) 118 configured to control the one or more engine(s) 112, and one or more fuel lines 120 to transfer fuel from the one or more fuel tank(s) 116 to the one or more engine(s) 112. As use herein, the term "fuel line" refers to any device for transporting fuel from, for instance, a fuel tank to a component that consumes the fuel, such as an engine. For example, as depicted in FIG. 2, aircraft 110 includes two engines 112A and 112B, which are controlled by two controllers 118A and 118B, respectively. Each controller 118 can be, for example, an Electronic Engine Controller (EEC) or an Electronic Control Unit (ECU) of a Full Authority Digital Engine Control (FADEC). Each controller 118 can include various components for performing various operations and functions. For example, and as further described herein, each controller 118 can include one or more processor(s) and one or more memory device(s). The one or more memory device(s) can store instructions that when executed by the one or more processor(s) cause the one or more processor(s) to perform the operations and functions, for example, as those described herein for communicating a signal.

Referring still to FIG. 2, fuel from fuel tank 116 can be provided to each engine 112 via one or more fuel lines 120. For example, as depicted, three fuel lines 120A, 120B, and 120C provide fuel. Fuel line 120C provides fuel from fuel tank 116 to fuel lines 120A and 120B, which provide fuel to engines 112A and 112B, respectively.

As shown in FIG. 2, the aircraft 110 can also include a communication network 130, such as an avionics network. Communication network 130 can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from a vehicle 10. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like. One or more computing devices 132 can be connected to the communication network 130 via one or more communication cables 134. The computing device(s) 132 can include various components for performing various operations and functions. For example, and as further described herein, the computing device(s) 132 can include one or more processor(s) and one or more memory device(s). The one or more memory device(s) can store instructions that when executed by the one or more processor(s) cause the one or more processor(s) to perform the operations and functions, for example, as those described herein for communicating a communication signal over a fuel line. The communication network 130 can include a data bus or a combination of wired and/or wireless communication links.

The communication network 130 can be coupled to one or more signal communication devices 140. Further, one or more signal communication device(s) 140 can be coupled to one or more controller(s) 118 of an engine 112. For example, as depicted in FIG. 2, a first signal communication device 140A is coupled to controller 118A, a second signal communication device 140B is coupled to controller 118B, and a third signal communication device 140C is coupled to communication network 130. Each signal communication device 140 can be coupled to one or more fuel line(s) 120 and configured to be in bidirectional communication with the one or more fuel line(s) 120 and/or another component coupled to the signal communication device 140. For example, first signal communication device 140A is coupled to fuel line 120A and can be configured to send and receive signals over fuel line 120A. Further, signal communication device 140A can send or receive signals to controller 118A. Similarly, signal communication device 140B can be configured to send or receive signals over fuel line 120B, and further can send or receive signals to controller 118B. Signal communication device 140C can be configured to send or receive signals over fuel lines 120A and 120B, and can be configured to send or receive signals from communication network 130. In this way, communication network 130 can be bidirectional communication with controllers 118A and 118B over fuel lines 120A and 120B, respectively.

Figure 3:
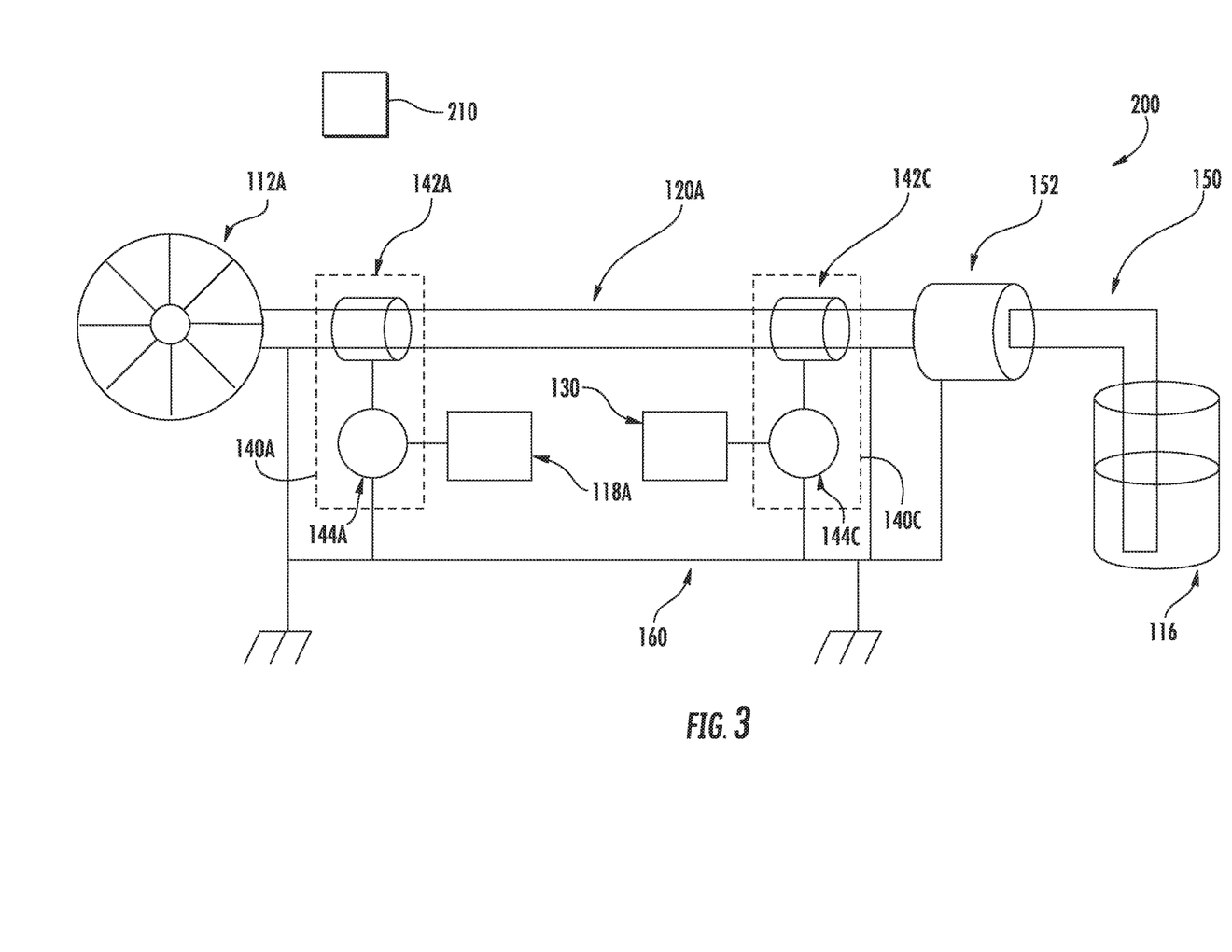
FIG. 3 depicts an example system according to example embodiments of the present disclosure.

Referring now to FIG. 3, an example system 200 for communicating a signal over a fuel line according to example embodiments of the present disclosure is depicted. System 200 can be implemented in a vehicle 10, such an aircraft, helicopter, automobile, boat, submarine, train, and/or any other suitable vehicles. As shown, system 200 can include a fuel tank 116, a fuel intake line 150, a fuel pump 152, and a fuel line 120A. Fuel pump 152 can be powered by a power source (not depicted). As depicted in FIG. 3, system 200 can include a single fuel line 120A. However, in an embodiment, any number of fuel lines can be in system 200, such as fuel lines 120A and 120B shown in FIG. 2. Fuel from fuel tank 116 can be pumped into fuel line 120A by fuel pump 152. Fuel in fuel line 120A can then be delivered to one or more fuel control valves of a controller 118A located within an engine housing of an engine 112A. Controller 118A can be, for example, an EEC or ECU of a FADEC. Engine 112A can be, for example, an engine 112A on an aircraft, as depicted in FIG. 2, and/or any engine on a vehicle 10. Controller 118A can be configured to receive various control signals and, based on those signals, control the geometry of an engine, such as engine 112A. Fuel line 120A can include a medium for propagating a communication signal. For example, fuel line 120A can include an electrical conductor, or a waveguide for sonic, microwave, millimeter wave, or optical signals. Other types of fuel lines 120 that include a medium for propagating a signal can also be used without departing from the scope or spirit of the present disclosure.

System 200 can also include a common ground 160, which may be a body portion of the vehicle 10 itself. Various components of the vehicle 10 can be connected to common ground 160. System 200 can further include one or more signal communication devices 140. For example, as depicted in FIG. 3, two signal communication devices 140A and 140C are shown. Signal communication devices 140A and 140C can be, for example, signal communication devices 140A and 140C shown in FIG. 2. In an embodiment, system 200 can include only a single signal communication device 140. Additionally, and/or alternatively, system 200 can include any number of signal communication devices. Each signal communication device can be coupled to a fuel line 120, and configured to send or receive signals over a fuel line 120.

Each signal communication device can also be coupled to a component of the vehicle 10. For example, as depicted in FIG. 3, signal communication device 140A is coupled to and in signal communication with controller 118A. Signal communication device 140A can be configured to provide communication signals received by signal communication device 140A over fuel line 120A to controller 118A. Further, signal communication device 140A can be configured to receive communication signals from controller 118A and send the communication signals over fuel line 120A. In this way, signal communication device 140A can be configured to be in bidirectional signal communication with a component of the vehicle 10, such as controller 118A, and fuel line 120A.

Further, signal communication device 140C can similarly be coupled to a component of the vehicle 10. For example, as depicted in FIG. 3, signal communication device 140C is coupled to and in signal communication with a communication network 130. Communication network 130 can be, for example, an avionics network as depicted in FIG. 1. Signal communication device 140C can be configured to provide communication signals received by signal communication device 140C over fuel line 120A to communication network 130. Further, signal communication device 140C can be configured to receive communication signals from communication network 130 and send the communication signals over fuel line 120A. In this way, signal communication device 140C can be configured to be in bidirectional signal communication with a component of the vehicle 10, such as communication network 130, and fuel line 120A.

Each signal communication device 140 can include a transducer 142, such as transducers 142A and 142C, and a transceiver 144, such as transceivers 144A and 144C, as depicted in FIG. 3. Other types of signal communication devices 140 can also be used without departing from the scope or spirit of the present disclosure. Each transceiver 144 can be configured to encode and/or decode a communication signal. For example, communication signals originating from the communication network 130 can be sent to transceiver 144C, which can encode the communication signal into an analog signal suitable for transmission over the fuel line 120A via transducer 142C. Each transducer 142 can be configured to send and/or receive signals over the medium for propagating a signal of a fuel line 120. Further, each transducer can be configured to monitor a fuel line 120 and provide signals to a transceiver 144. For example, using transducer 142C, transceiver 144C can monitor fuel line 120A for communication signals present on fuel line 120A to receive transmissions from transducer 142A while cancelling its own signal echoes from the far end using standard signal processing techniques. Furthermore transceiver 144C can decode signals received from transducer 142A into a digital format and perform message filtering, error detection and correction, and delete messages which cannot be corrected. Undeleted messages can be formatted into frames by transceiver 144C into a format suitable for transmission over the communication network 130.

Referring still to FIG. 3, communication signals originating from controller 118A can be sent to transceiver 144A. Transceiver 144A can encode the communication signals into an analog signal suitable for transmission over the fuel line 120A via transducer 142A. Using transducer 142A, transceiver 144A can also monitor fuel line 120A for communication to receive transmissions from transducer 142C while cancelling its own signal echoes from the far end using standard signal processing techniques. Furthermore, transceiver 144A can decode communication signals received from transducer 142C into a digital format and perform message filtering, error detection and correction, and delete messages which cannot be corrected. Undeleted messages can be formatted into frames by transceiver 144A into a format suitable for use by the controller 118A.

In an embodiment, fuel line 120A can be electrically conducting and the transducers 142C and 142A can be conducting coils. For example, fuel line 120A can be an aluminum tube configured to conduct an electrical current. Transducers 142C and 142A can each have a transmit coil and a sensing coil. Each transducer 142 can be configured to inject a current into the transmit coil to impose a current loop through a conduction path that includes fuel line 120A and common ground 160. The sensing coils can be configured to detect the varying magnetic fields surrounding fuel line 120A and convert the magnetic fields to a voltage signal received by transceivers 144A and 144C.

In another embodiment, fuel line 120A can be electrically conducting, such as an aluminum tube, and the fuel line 120A and common ground 160 can together form a conducting loop. The conducting loop formed by fuel line 120A and common ground 160 can further form a broadband antenna which can receive ambient electromagnetic waves, for example, radio waves from a remote signal communication device 210, such as a satellite, television, radio transmitters or wireless network. Transducers 142C and 142A can be configured to receive and amplify the electromagnetic emissions received by fuel line 120A in selected frequencies. Furthermore, transducers 142C and 142A can be configured to vary the amount of signal energy absorbed in certain frequencies as the means to transmit digital signals. For example, transmitting a signal from transducer 142C to transducer 142A can be performed by transducer 142C modulating its absorption of ambient electromagnetic energy present in fuel line 120A in frequency band A, while transmitting a signal from transducer 142A to transducer 142C can be performed by transducer 142A modulating its absorption of ambient electromagnetic energy present in fuel line 120A in frequency band B. Further, transceiver 144A can process the energy variations in frequency band A as amplitude modulation (AM) and further use a digital AM receiver to construct a digital message for Controller 118A. Similarly, transceiver 144C can convert the relative variations of amplitude in frequency band B from transducer 142C to a digital message for the communication network 130.

In another embodiment, each transducer 142 can transmit and receive sonic signals, for example, ultrasound signals which are conducted by fuel line 120A. For example, transducers 142A and 142C can each have a sonic transmitter and a sonic sensor, such as, for example, a piezoelectric sound generator and microphone. Each sonic transmitter and receiver can be configured such that transceivers 144A and 144C can send a communication signal to each respective sonic transmitter contained within transducers 142A and 142C, respectively. Transducers 142A and 142C can then send the communication signal over fuel line 120A by transmitting the communication signal with the sonic transmitter. Transducers 142A and 142C can be configured such that the sonic receivers, such as microphones contained within 142C and 142A, can receive the communication signal, and further send the communication signal to transceivers 144A and 144C, respectively. Transceivers 144A and 144C can then digitize, error correct or delete uncorrectable data for controller 118A or communication network 130, respectively.

In another embodiment, fuel line 120A can be configured to carry ambient soundwaves from the surrounding environment, such as sound waves received as vibrations from the engine, fuselage or the air. To send a communication signal, for example, from transducer 142C to transducer 142A, transducer 142C can modulate its absorption of ambient sound waves received by fuel line 120A in frequency band A. Similarly, to send a communication signal from transducer 142A to transducer 142C, transducer 142A can modulate its absorption of sound waves received by fuel line 120A in frequency band B. In this way, transducers 142A and 142C can transmit and receive sonic signals, for example, ultrasound signals which are conducted between them by fuel line 120A. Further, transducers 142A and 142C can each have a sonic damper and a sonic sensor, such as, for example, an electrically controlled vibration damper and microphone. Each sonic damper and receiver can be configured such that transceivers 144A and 144C can send a communication signal to a sonic damper contained within transducers 142A and 142C, respectively. Transducers 142A and 142C can be configured to send the communication signal over fuel line 120A and the sonic receivers or microphones contained within transducers 142A and 142C can receive the communication signal, and further provide the communication signal to transceivers 144A and 144C respectively. Transceivers 144A and 144C can then digitize, error correct or delete uncorrectable data, and provide the communication signal to controller 118A or communication network 130, respectively.

In another embodiment, fuel flowing in fuel line 120A can exhibit laminar flow as it flows from fuel pump 152 to engine 112A. To send a communication signal, for example, from transducer 142C to transducer 142A, transducer 142C can modulates periodic turbulence within the laminar flow, which can be detected by transducer 142A. Transducer 142A can then provide the communication signal to transceiver 144A, which can decode the signal into digital signal. Similarly, transducer 142A can transmit a communication signal in the reverse direction to transducer 142C by either allowing a reflection of the turbulence generated by transducer 142C or canceling it.

In another embodiment, fuel line 120A can be a waveguide for microwave, millimeter wave, or optical signals. Transducers 142A and 142C can each contain a signal transmitter and receiver tuned to specific wavelengths which can be used to convey digital signals between them using one of a variety of well-known modulation techniques.

In this way, a signal communication device 140 can be used to send or receive communication signals over a fuel line 120 on a vehicle 10, and further, provide the communication signals to a component of the vehicle 10.

Figure 4:
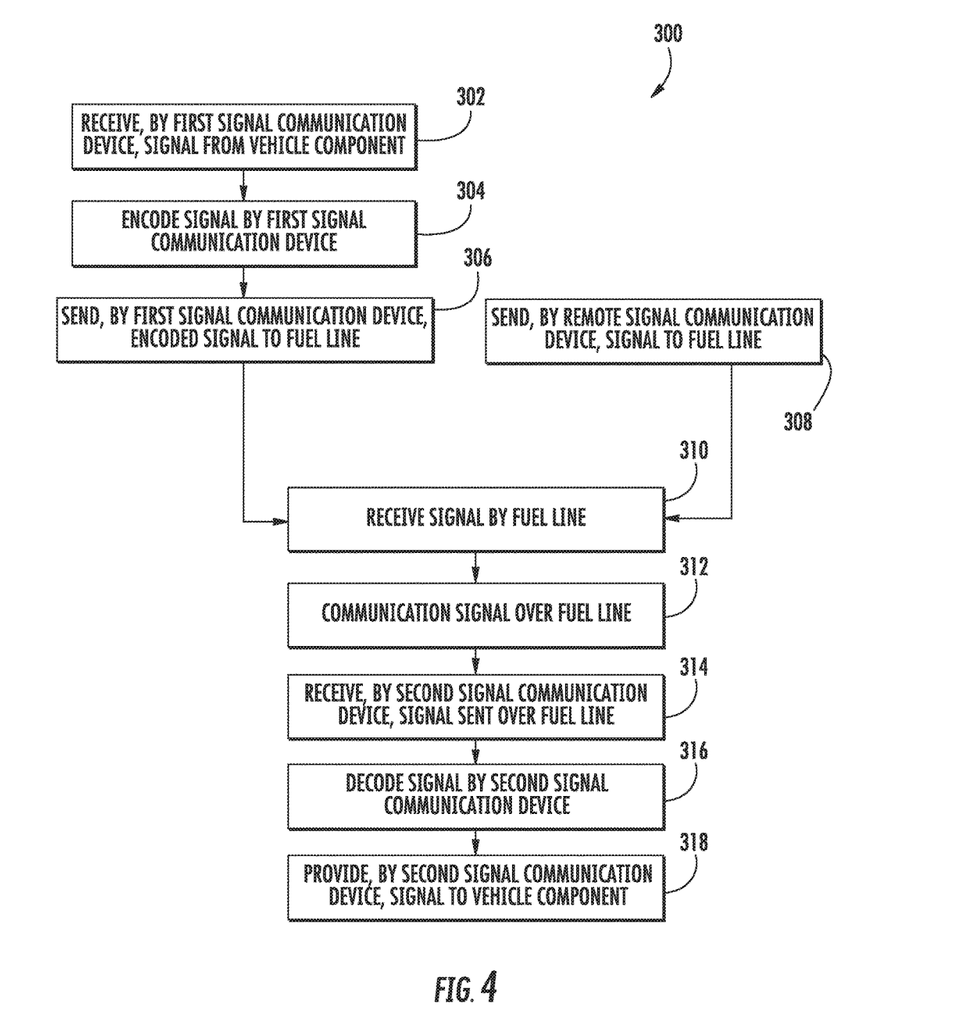
FIG. 4 depicts a flow diagram of an example method for communicating a signal over a fuel line in an vehicle according to example embodiments of the present disclosure.

FIG. 4 depicts a flow diagram of an example method (300) for communicating a signal over a fuel line according to example embodiments of the present disclosure. Some or all of steps of method (300) can be implemented by one or more computing device(s), such as the computing device(s) shown in FIG. 5. One or more step(s) of the method (300) can be performed while the vehicle 10 is in operation, such as when an aircraft 110 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (302), the method (300) can include receiving, by a first signal communication device, a signal from a vehicle component. For example, a signal communication device 140 can be coupled to a vehicle component, such as a communication network 130 as depicted in FIG. 3. For example, a communication signal can be a setpoint for operation of an engine 112A sent by a computing device 132, as depicted in FIG. 2. The computing device 132 can send the communication signal to a communication network 130, which can then send the communication signal to a signal communication device 140C, as shown in FIG. 3.

At (304), the method (300) can include encoding the communication signal by a signal communication device. For example, a communication signal can be a digital signal received by a signal communication device 140C. A transceiver, such as a transceiver 144C, can encode the digital signal into an analog signal. The analog signal can then be provided, for example, to a transducer 142C.

At (306), the method (300) can include sending, by a signal communication device, the encoded communication signal to a fuel line. For example, a transducer 142C can be coupled to a fuel line, such as a fuel line 120A. Fuel line 120A can include a medium for propagating a signal, such as an electrical conductor or a waveguide for sonic, microwave, millimeter wave, or optical signals. The transducer 142C can be configured to send a signal over the fuel line 120A, such as, for example, by a conducting coil configured to communicate an encoded communication signal by creating a magnetic field that excites an electrical current in an electrical conductor of a fuel line 120A corresponding to the encoded communication signal. The transducer 142C can then send the encoded communication signal to the fuel line 120A.

At (308), the method (300) can include sending, by a remote signal communication device, a signal to the fuel line. For example, a remote signal communication device 210 can be a satellite, television, radio transmitters or wireless network and can be configured to send a signal to an aircraft 110.

At (310), the method (300) can include receiving a communication signal by a fuel line. For example, a communication signal can be an electrical current excited in an electrical conductor in a fuel line 120A by a transducer 142C. In another example, a fuel line 120A can be coupled to a common ground 160, and together the fuel line 120A and common ground 160 can form a broadband antenna. A communication signal sent by a remote signal communication device 210, such as a satellite or ground based radio transmitter, can be received by the fuel line 120A.

At (312), the method (300) can include communicating the signal over the fuel line. For example, a fuel line 120A can include an electrical conductor configured to propagate a communication signal over the electrical conductor. The communication signal, once received by the fuel line 120A, can propagate along the electrical conductor. For example, an encoded analog communication signal can travel over the fuel line as an electrical current.

At (314) the method (300) can include receiving, by a second signal communication device, the communication signal sent over the fuel line. For example, a second signal communication device can be a signal communication device 140A coupled to a controller 118A. The signal communication device 140A can include a transducer 142A coupled to the fuel line 120A. The transducer 120A, can, for example, include a sensing coil configured to sense a magnetic field created by a current flowing through an electrical conductor of a fuel line 120A. The transducer 142A can be configured to receive an encoded analog communication signal in the form of variations in a magnetic field. The transducer 142A can receive the communication signal, including signals sent from a remote signal communication device 210, or a first signal communication device, such as a signal communication device 140C.

At (316), the method (300) can include decoding the communication signal by a second signal communication device. For example, a signal communication device 140A can include a transceiver 144A. Transceiver 144A can be configured to receive the communication signal received over fuel line 120A by transducer 142A. For example, an encoded analog signal can be received by transducer 142A, and provided to transceiver 144A, which can decode the analog signal into a digital signal suitable for use by a component of the aircraft.

At (318), the method (300) can include providing, by the second signal communication device, the communication signal to a vehicle component. For example, a second signal communication device 140A can be in signal communication with a controller 118A configured to control an engine 112A. Signal communication device 140A can provide the signal received over the fuel line 120A, such as a setpoint for operation of engine 112A, to controller 118A. Controller 118A can then control engine 112A based on the communication signal.

Figure 5:
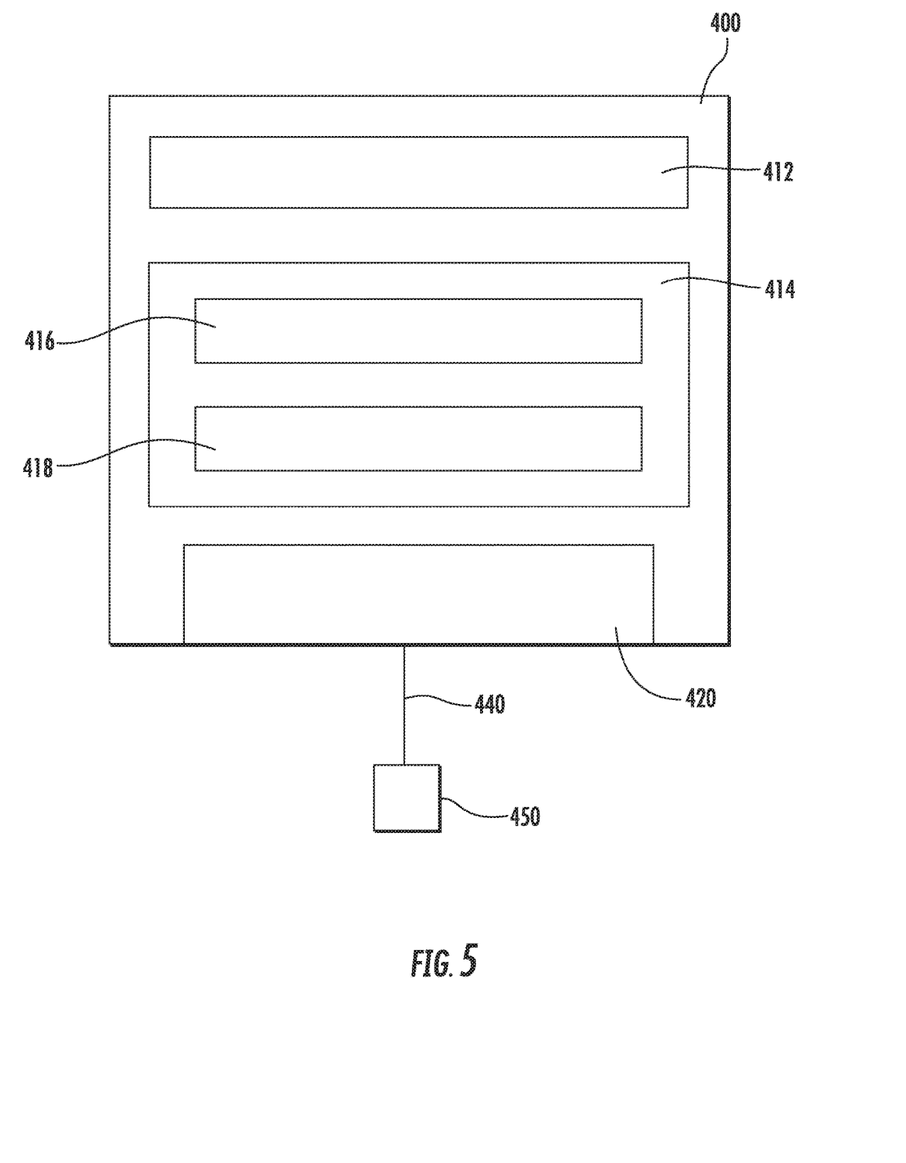
FIG. 5 depicts an example controller according to example embodiments of the present disclosure.

Referring now to FIG. 5, an example controller for use according to example embodiments of the present disclosure is shown. Controller 400 can be, for example, a controller 118 configured to control an engine 112, such as EEC or ECU of a FADEC. Further, controller 400 can be, for example, a computing device 132 as depicted in FIG. 2. As shown, the controller(s) 400 can include one or more processors 412 and one or more memory devices 414. The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices.

The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations. The instructions 416 can be implemented in software written in any suitable programming language or can be implemented in hardware. In some embodiments, the instructions 416 can be executed by the one or more processors 412 to cause the one or more processors 412 to perform operations, such as the operations for controlling the control valves of an engine 112.

Referring still to FIG. 5, the memory devices 414 can further store data 418 that can be accessed by the processors 412. The data 418 can include, for instance, operating parameters and other data.

The controller(s) 400 can further include a communications interface 420. The communications interface 420 can be configured to communicate with vehicle systems over a communication network 440. The communication network 440 can be, for example, a communication cable 134, or any other medium or network for communicating a signal. For instance, the communications interface 420 can receive communication signals sent by a component of a vehicle 450, such as a signal communication device 140, a communication network 130, or an engine 112. The communications interface 420 can include any suitable components for interfacing with one more other devices, including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   a fuel line, the fuel line comprising at least one communication medium for communicating a communication signal;
   a controller;
   a network;
   a first signal communication device in bidirectional communication with the network, the first signal communication device coupled to the fuel line, wherein the first signal communication device comprises a transducer comprising a transmit coil and a sensing coil, wherein the sensing coil is configured to receive the communication signal communicated over the fuel line; and
   a second signal communication device in bidirectional communication with the controller, the second signal communication device coupled to the at least one fuel line, wherein the first signal communication device and the second signal communication device are in bidirectional signal communication with each other over the at least one fuel line, and
   wherein at least one of the first signal communication device and the second signal communication device is further configured to encode the communication signal, and wherein the sensing coil detects varying magnetic fields surrounding the fuel line, and wherein the first signal communication device and the second communication device each comprise at least one transceiver and the second communication device comprises a transducer, and wherein the first signal communication device and the second communication device are each further configured to decode the communication signal, and wherein the at least one transceiver of the first signal communication device decodes signals received from the transducer of the first communication device into a digital format and the at least one transceiver of the second signal communication device decodes signals received from the transducer of the second communication device into a digital format.

2. The system of claim 1, further comprising:
a common ground electrically connected to the fuel line, wherein the communication medium comprises an electrical conductor; and
wherein the transmit coil imposes a current loop though a conduction path, the conduction path including the fuel line and the common ground.

3. The system of claim 2, wherein the fuel line and the common ground together act as an antenna to receive a communication signal from a remote signal communication device, wherein the communication signal is communicated over the electrical conductor, and
wherein the fuel line comprises aluminum.

4. The system of claim 1, the transducer further comprising:
a piezoelectric sound generator; and
a microphone,
wherein the communication medium comprises a waveguide for sonic, microwave, millimeter wave, or optical signals.

5. The system of claim 1, wherein the communication medium comprises fuel flowing through the fuel line, and
wherein at least one of the first signal communication device and the second signal communication device receives vibrations from a vehicle component of a vehicle that includes the fuel line.

6. The system of claim 1, wherein the at least one transceiver performs message filtering, error detection, and error correction, and
wherein the at least one transceiver deletes messages which cannot be corrected.

7. The system of claim 5, wherein the vehicle component comprises at least one of a controller and a communication network, and
wherein the transducer receives and amplifies electromagnetic emissions received by fuel line in selected frequencies.

8. A method of communicating a communication signal via a fuel line on a vehicle, comprising:
receiving, by a first signal communication device, a communication signal from a communication network in bidirectional communication with the first signal communication device;
encoding, by the first signal communication device, the communication signal;
sending, by the first signal communication device, the communication signal to a fuel line on a vehicle, the fuel line coupled with the first signal communication device;
receiving, from the first signal communication device, the communication signal by a communication medium of the fuel line;
communicating the communication signal via the communication medium;
receiving, by a sensing coil of a transducer of a second signal communication device, the communication signal communicated via the communication medium, wherein the transducer comprises a transmit coil, wherein the second signal communication device comprises a transceiver;
decoding, by the second communication device, the communication signal, and wherein the transceiver of the second signal communication device decodes the communication signal received from the sensing coil of the transducer of the second communication device into a digital format, and
providing, by the second signal communication device, the communication signal to one or more components of the vehicle, wherein one of the one or more components of the vehicle include a controller in bidirectional communication with the second signal communication device.

9. The method of claim 8, wherein the communication signal comprises at least one of a sonic, optical, electrical, microwave, or millimeter wave signal, or a periodic turbulence in a laminar flow of a fuel flowing in the fuel line.

10. The method of claim 8, wherein one of the one or more components of the vehicle include the communication network.

11. An aircraft, comprising:
at least one engine;
a controller configured to control the at least one engine;
an avionics network;
at least one fuel tank;
at least one fuel line configured to transfer fuel from the at least one fuel tank to the at least one engine, the at least one fuel line comprising a communication medium for communicating a communication signal;
a first signal communication device in bidirectional communication with the avionics network, the first signal communication device coupled to the at least one fuel line, wherein the first signal communication device comprises a transducer comprising a transmit coil and a sensing coil, wherein the sensing coil is configured to receive the communication signal communicated over the fuel line;
a second signal communication device in bidirectional communication with the controller, the second signal communication device coupled to the at least one fuel line; and
wherein the first signal communication device and the second signal communication device are in bidirectional signal communication with each other over the at least one fuel line.

12. The aircraft of claim 11, wherein the first signal communication device and the second signal communication device each comprise a transceiver and the second signal communication device comprises another transducer.

13. The aircraft of claim 11, wherein the sensing coil is further configured to detect varying magnetic fields surrounding the fuel line.

* * * * *